May 9, 1950  J. B. GIERN ET AL  2,507,204
PILOT DEVICE FOR ROTARY TOOLS
Filed Nov. 17, 1948

Inventor
James B. Giern
Anders P. Anholt
By Barthel + Bugbee
Attorneys

Patented May 9, 1950

2,507,204

UNITED STATES PATENT OFFICE 2,507,204

PILOT DEVICE FOR ROTARY TOOLS

James B. Giern, Romeo, and Anders P. Anholtt, Detroit, Mich.

Application November 17, 1948, Serial No. 60,464

3 Claims. (Cl. 77—62)

1

This invention relates to pilot devices and, in particular, to pilot devices used for guiding rotary tools, such as drills, so that the tool will enter the workpiece at the desired location and will also maintain the desired direction of travel without wobbling or veering.

One object of this invention is to provide a pilot device having a hardened rotary bushing therein for receiving and guiding a rotary tool, this bushing being rotatably supported by anti-friction bearing elements in such a manner that the bushing will rotate with the tool being guided while the bushing holder is held stationary, thereby eliminating friction and wear between the bushing and the tool and consequently eliminating the heat resulting from such friction.

Another object is to provide a pilot device of the foregoing character, wherein the tool and rotary bushing can be fitted so snugly to each other that wobble, and consequently inaccuracy, of the rotary tool is greatly reduced.

Another object is to provide a pilot device of the foregoing character, wherein the rotary bushing and the bushing holder directly constitutes the inner and outer races of the bearing elements, thereby eliminating the need for separate bearing races and consequently reducing the over all diameter of the device for a given size of tool.

Another object is to provide a pilot device of the foregoing character, wherein the bearing elements are widely spaced axially along the bushing, thereby still further reducing any tendency of the bushing to wobble within the bushing holder as the bushing rotates with the tool.

A still further object is to provide a pilot device of the foregoing character so constructed and arranged that both radial and axial thrusts are counteracted and substantially eliminated, thereby reducing wear.

Figure 2:
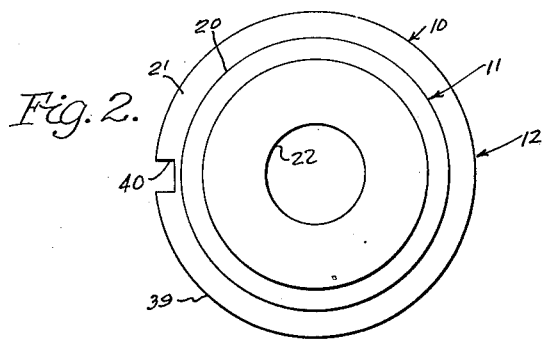
Figure 2 is a top plan view of the pilot device shown in Figure 1.
Figure 3:
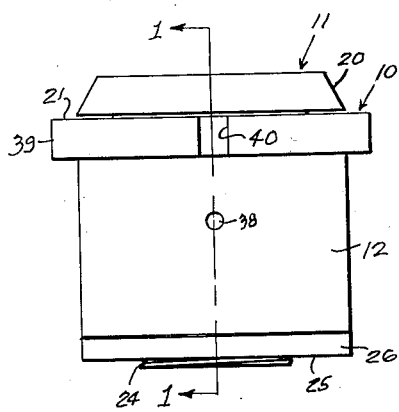
Figure 3 is a side elevational view thereof.
Figure 1:
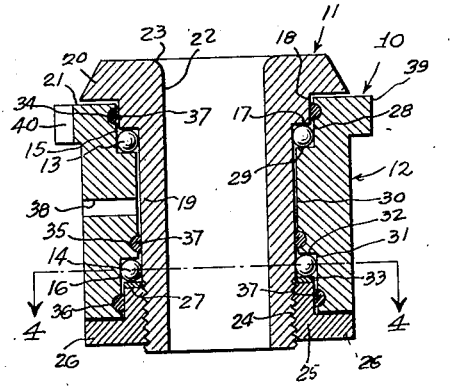
Figure 1 is a vertical longitudinal section of the pilot device, according to a preferred form of the invention.
Figure 4:
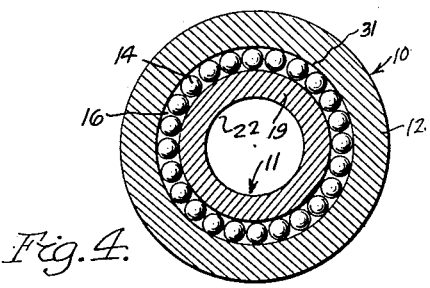
Figure 4 is a cross section taken along the line 4—4 in Figure 1.

Referring to the drawings in detail, Figure 1 shows a preferred form of this invention, generally designated 10. The pilot device 10 consists generally of a hardened rotary bushing 11, rotatably mounted within a stationary bushing holder 12 by means of bearing elements 13 and 14, preferably consisting of ball bearings, housed in

2 annular cavities 15 and 16 respectively. The upper wall of the annular cavity 15 is formed by providing the bushing 11 with a stepped portion formed with an annular shoulder 17 lying between the annular portion 18 and the reduced diameter portion 19. Above the annular portion 18 the bushing 11 is provided with an annular flange 20 spaced slightly away from the upper end 21 of the bushing holder 12 to establish a clearance therebetween.

The bushing 11 is provided with a longitudinal bore 22 of such a diameter as will snugly fit the rotary tool to be guided and yet, at the same time, permit the tool to be fed longitudinally through the bore 22 into the workpiece (not shown). The upper end of the bore 22 is rounded as at 23 to facilitate the insertion of a tool. The lower end portion of the bushing 12 is threaded as at 24 to receive a correspondingly threaded retaining nut or collar 25 having a lower end flange 26 and an upper end 27.

The upper end portion of the bushing holder 12 is provided with a counterbore 28 for receiving the annular portion 18 of the bushing 11. The annular bottom wall 29 of the counterbore 28 serves as the lower wall of the cavity 15 and leads to a reduced diameter bore 30, which receives the reduced diameter portion 19 of the bushing 11. The lower end portion of the bushing holder 12 is also provided with a counterbore 31 for receiving the upper end 27 of the retaining nut 25. The annular top wall 32 of the counterbore 31 serves as the upper wall of the cavity 16. Forming the bottom wall of the cavity 16 and supporting the bearing element 14 therein is a wear or thrust ring 33, preferably of steel, which is, in turn, supported by the upper end 27 of retaining nut 25. Thrust ring 33 not only helps to compensate for inaccuracies in counterbores 28 and 31, but also absorbs any frictional tendency of bearing element 14, in the course of operation, to unscrew threaded retaining nut 25 from its engagement with threaded lower end portion 24 of bushing 12. Annular flange 26 of nut 25 is spaced slightly away from the lower end of the bushing holder 12 to establish a clearance therebetween, thus preventing friction which might also tend to unscrew the retaining nut 25.

In order to prevent dirt from entering the bearing elements 13 and 14, as well as to prevent leakage of lubricant, the bearing holder 12 is provided with axially-spaced annular recesses 34, 35 and 36 containing oil retaining rings 37 of rubber, felt, or any suitable material. Extending radially thru one side of the bushing holder 12 is an oil hole 38 by means of which lubricant may be furnished to the bearing elements 13 and 14. The upper end portion 21 of the bushing holder 12 is provided with a flange 39 to prevent the bushing holder from slipping down into the die (not shown). Into the outer edge of the flange 39 is cut a notch or similar aperture 40 into which a stationary dog (not shown), part of the die, may be inserted to prevent rotation of the bushing holder.

In the operation of the invention, let it be assumed that the pilot device 10 has been inserted in a hole in the jig so that the dog (not shown), which projects upward and inward near the edge of the hole, engages the notch 40 in the flange 39 of the bushing holder 12. The rotary tool, such as a drill, is then inserted in the bore 22 in the rotary bushing 11 so that it fits snugly and will cause the bushing to turn with it. The operator now operates the machine in the usual manner causing the tool to be fed downward through the bushing bore 22 into the workpiece. The relatively snug fit between the tool and the bushing bore 22 prevents the tool from wobbling and insures an accurately located bore which is also of accurate diameter. The tool causes the bushing 22 to rotate upon its anti-friction bearing assemblies 13 and 14, transferring the radial thrust through these to the shouldered bushing holder 12 and the axial thrust to the thrust ring 33 mounted on the bearing retainer.

By the use of the present invention, the bearing bushing and bushing holders serve directly as the bearing raceways, and therefore enable the over all diameter of the bushing holder to be of the minimum diameter. The members 11 and 12 are also conveniently manufactured by automatic machinery and the annular shoulders thereon may be ground easily and efficiently. It is preferable that a clearance of about 20 thousandths of an inch be left between the flange 20 and the upper end portion 21 of the bushing holder 12 so as to permit dust to enter and leave, because a narrower clearance frequently results in binding due to the entry of dust particles. The steel thrust washer 33 is easily renewed when worn and the entire device is easily maintained in accurate condition. Either set of the anti-friction bearing balls 13 or 14 takes the thrusts in the opposite direction, resulting from the insertion or withdrawal respectively of the rotary tool.

What we claim is:

1. A pilot device for guiding a rotary tool into a work piece comprising a bushing holder having a bore therethrough, a guide bushing structure rotatably mounted in said bore and having a tool-guiding bore therethrough co-axial with said bushing holder bore, said bushing holder having a pair of axially-spaced annular shoulders thereon, said bushing structure having a pair of axially-spaced annular shoulders disposed adjacent said bushing holder shoulders and in opposed spaced relationship therewith to form annular bearing recesses, and a spaced pair of annular anti-friction bearing element assemblies mounted in said bearing recesses, said bushing structure including an annular bearing retainer mounted thereon adjacent one of said recesses.

2. A pilot device for guiding a rotary tool into a work piece comprising a bushing holder having a bore therethrough, a guide bushing structure rotatably mounted in said bore and having a tool-guiding bore therethrough co-axial with said bushing holder bore, said bushing holder having a pair of axially-spaced annular shoulders thereon, said bushing structure having a pair of axially-spaced annular shoulders disposed adjacent said bushing holder shoulders and in opposed spaced relationship therewith to form annular bearing recesses, a spaced pair of annular anti-friction bearing element assemblies mounted in said bearing recesses, said bushing structure including an annular bearing retainer mounted thereon adjacent one of said recesses, and an annular thrust member mounted on said bushing structure between said retainer and one of said assemblies.

3. A pilot device for guiding a rotary tool into a work piece comprising a bushing holder having a bore therethrough, a guide bushing structure rotatably mounted in said bore and having a tool-guiding bore therethrough co-axial with said bushing holder bore, said bushing holder having a pair of axially-spaced annular shoulders thereon, said bushing structure having a pair of axially-spaced annular shoulders disposed adjacent said bushing holder shoulders and in opposed spaced relationship therewith to form annular bearing recesses, and a spaced pair of annular anti-friction bearing element assemblies mounted in said bearing recesses, said bushing structure including an annular bearing retainer mounted thereon adjacent one of said recesses, said bushing holder having an outwardly extending flange at one end thereof remote from said retainer.

JAMES B. GIERN.
ANDERS P. ANHOLTT.

REFERENCES CITED

The following references are of record in the file of this patent:

UNITED STATES PATENTS

| Number | Name | Date |
|---|---|---|
| 2,353,295 | Day | July 11, 1944 |

FOREIGN PATENTS

| Number | Country | Date |
|---|---|---|
| 361,981 | Germany | 1922 |